March 29, 1960     M. H. HOLLINGSWORTH     2,930,858
BINAURAL HEARING-AID DEVICE
Filed July 15, 1954     3 Sheets-Sheet 1
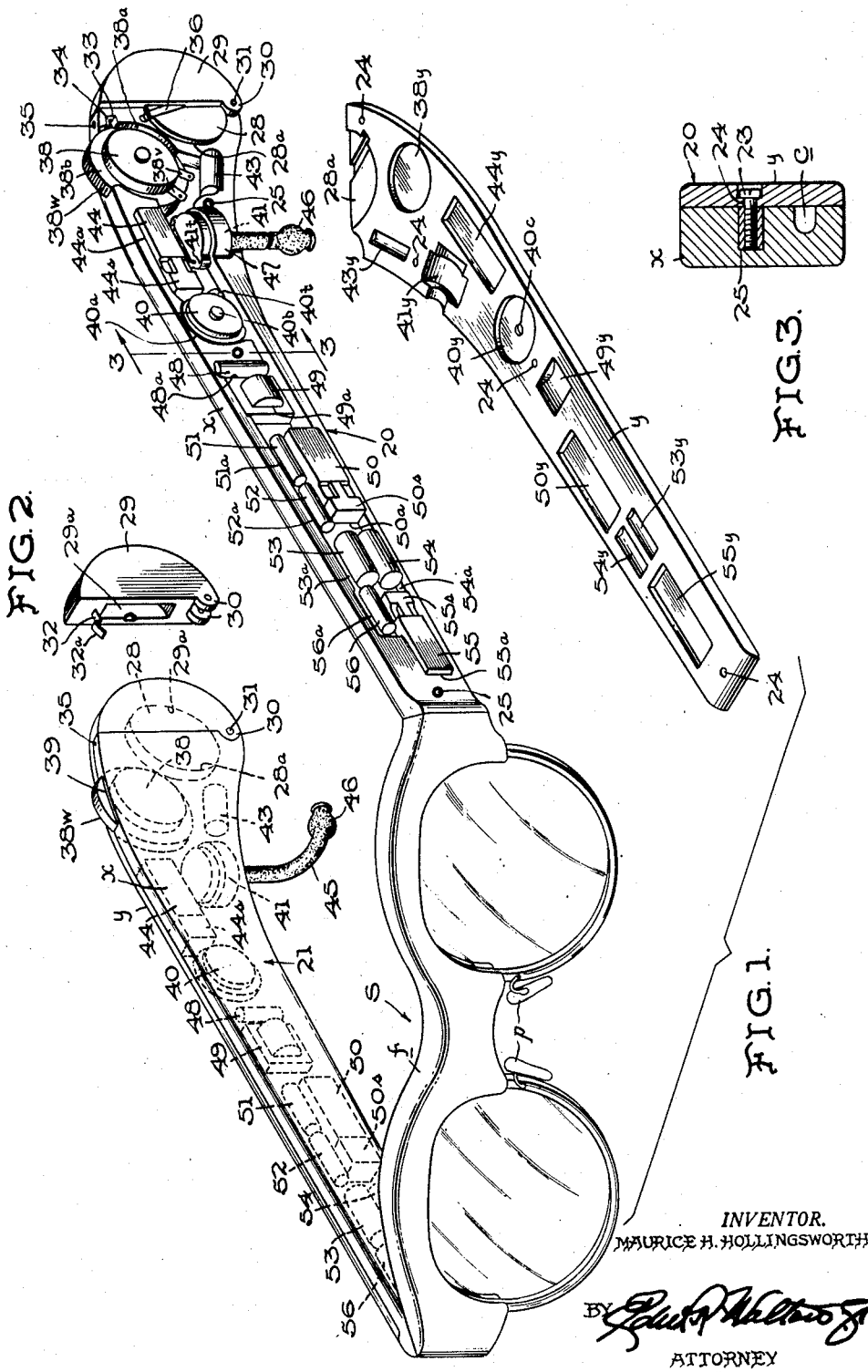
INVENTOR.
MAURICE H. HOLLINGSWORTH
ATTORNEY March 29, 1960 M. H. HOLLINGSWORTH 2,930,858
BINAURAL HEARING-AID DEVICE
Filed July 15, 1954 3 Sheets-Sheet 2
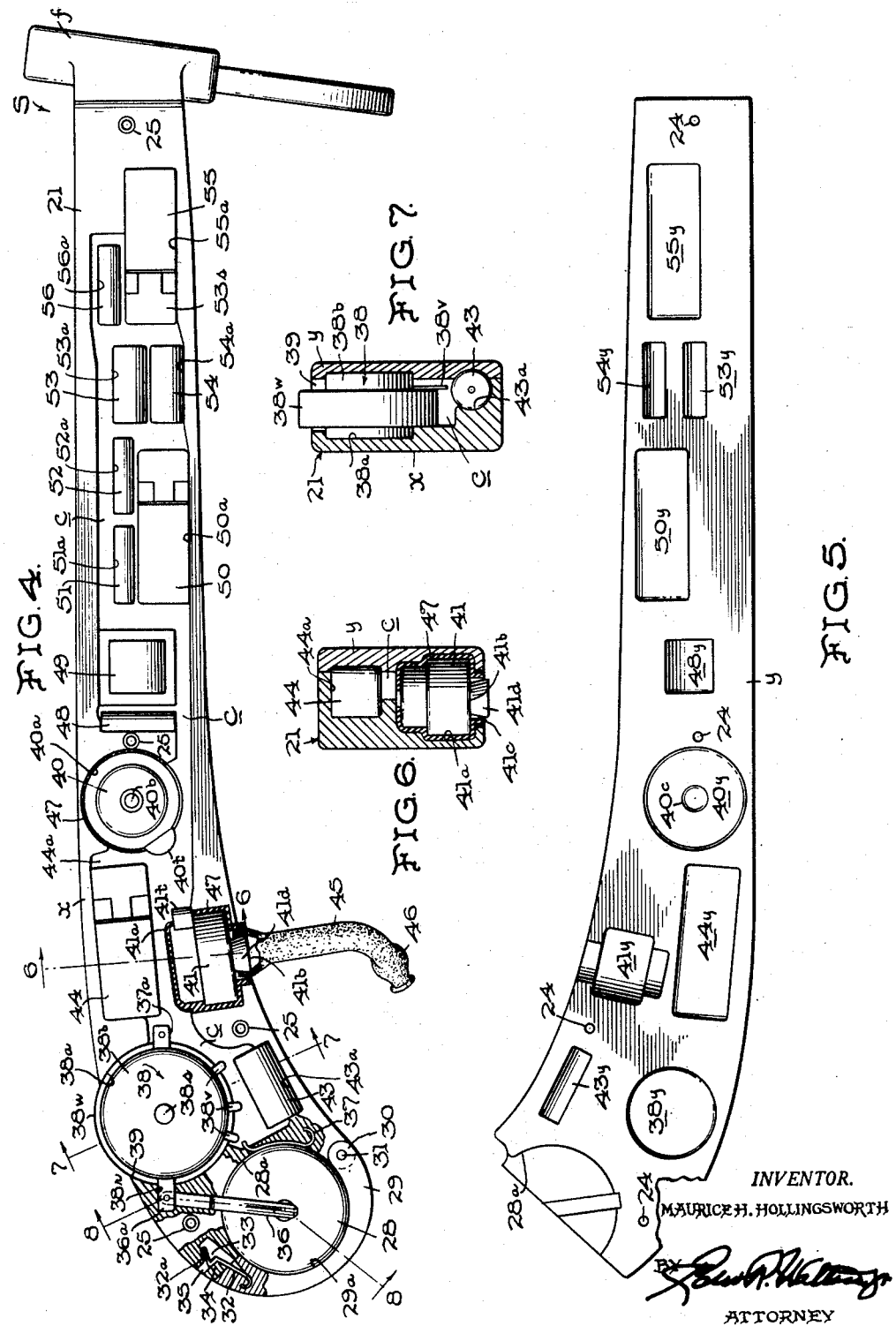
INVENTOR.
MAURICE H. HOLLINGSWORTH
ATTORNEY March 29, 1960 M. H. HOLLINGSWORTH 2,930,858
BINAURAL HEARING-AID DEVICE
Filed July 15, 1954 3 Sheets-Sheet 3

INVENTOR.
MAURICE H. HOLLINGSWORTH
BY
ATTORNEY

United States Patent Office 2,930,858
Patented Mar. 29, 1960

2,930,858
BINAURAL HEARING-AID DEVICE
Maurice H. Hollingsworth, Corpus Christi, Tex.; Eleanor Hollingsworth, executrix of said Maurice H. Hollingsworth, deceased, assignor to Eleanor Humphries (formerly Eleanor Hollingsworth)
Application July 15, 1954, Serial No. 443,538
6 Claims. (Cl. 179—107)

The present invention relates to a binaural hearing-aid for hard-of-hearing persons and is a continuation-in-part of an application of the same inventor, Serial No. 401,629, filed December 31, 1953, entitled Improved Hearing Aid, which in turn is a continuation-in-part of another application by the same inventor, Serial No. 196,657, filed November 20, 1950 and entitled Audiophone.

By design, or fortuitously, most animals, particularly human beings, have been provided with two independent ears one on each side of the head—which arrangement provides natural binaural hearing, having many advantages over monaural hearing, by enabling localization of most sounds on the basis of a difference of time of arrival i.e. phasing of corresponding parts of the sound waves at the spaced audio-organs or ears; and, since the ears and the brain can detect a difference of time as small as 10/1,000,000 of a second and report it as a difference of direction, binaural hearing persons are able to detect the direction of the sound source, to hear the sounds in external depth, to detect change in or movement of the sound source, to keep separate two or more simultaneously occurring sounds or conversations originating at different points or places and to have transmitted to the brain other information pertaining to the hearing environment. High frequency tones are localized on the basis of a difference in intensity at the two ears, but low frequency tones or noises, including speech, are localized on the basis of time difference at the two ears and movements of the head aid greatly in the accuracy of this localizing function. Also, it is known that both pitch discrimination and volume discrimination of sound by hearing sensitivity are better discernible and identifiable with two normal ears spaced on opposite sides of the head of a human being than with one ear. Thus, persons having normal hearing sensitivity, continually rely upon binaural hearing to determine the kind and quality of sound and the direction from which it emanates for normal activities as well as in emergencies, as it is most important as a means of self-preservation and survival, as well as contributing greatly to one's intelligence of sound and to one's memory recall for identification of a particular sound or sounds and the facts and circumstances associated therewith.

Binaural hearing, therefore, increases the ability of an individual to identify a sound, not only because of the increased overall sensitivity of having two ears, but mainly because of the phasing (time-delay) of the sound waves, as they are received by the two spaced ears and interpreted by the brain, offers an entire separate class of information for identification purposes. In speech, for example, one detects the direction from which the speech is coming through binaural hearing, even though one may not be able to see the individual speaking, and thereby is able to select the best position to turn his head so that the speech is clearer and more intelligible although it may occur simultaneously with other sounds or conversations.

Heretofore, so far as is known, hearing aids now on the market are monaural in that they provide either one receiver, to improve the hearing of one ear, or provide two receivers, one for each ear; but in either case the receiver or receivers are connected to a single microphone carried on the person of the user in some manner remote from or unnaturally removed from the ear or ears served by said microphone. Thus, the sound is not heard by the wearer as it would be by two normal ears—i.e., with depth and direction—but as it may be heard by only one ear; and, when emanating simultaneously from two different sources, said sounds are not distinguishable in their proper spatial relation, because the microphone and its associated receiver are not both positioned on the same side of the head and adjacent the defective ear or ears they serve. This is also the case with spectacle hearing-aids of the monaural type, where the microphone is in one temple bow and connected with a receiver in the other temple bow adjacent the ear it serves.

Binaural hearing must follow the pattern found in nature—i.e., a microphone should be located at or adjacent each defective ear, respectively, and move with the head of the user, and should be independently connected with a receiver associated with the same ear or side of the head as the microphone serving said receiver. In such electrically operated hearing aids, the parts on each side of the head should be independently controlled as to volume or amplification to satisfy the requirements of the ear it serves; and, further, when the microphone and receiver are mounted on the same supporting member in close proximity to each other on one side of the head, they should be so related and/or mounted in their supporting means as to eliminate or reduce to an inconsequential minimum the acoustical feedback from the receiver to the microphone.

The principal object, therefore, of the present invention is to overcome the deficiencies of the prior art by providing an operative and truly binaural hearing-aid, all the parts of which—except the receiver in certain instances later specified—are incapsulated and concealed within one temple-piece or bow of a conventional spectacles frame to support the hearing-aid with its receiver and microphone in close proximity to a defective ear on at least one side of the wearer's head, when only one ear of the wearer needs aid, and by providing another hearing-aid in the other temple piece or bow in the manner just stated, when both ears need aid—thus (1) taking the most efficient advantage of the natural characteristics of true binaural hearings; (2) enabling the eye specialist to select, fit and mount the proper lenses in the proper frontal len's frame for the wearer and enabling the ear specialist to separately select the proper temple pieces for the hearing requirements of the wearer and apply them to the lens' frame by hingedly mounting them to the ends, respectively, of the lens' frame—hence allowing each of these specialists to perform their respective functions to satisfy the requirements of the wearer without interfering with each other in the performance of these functions; and (3) further avoiding the embarrassment of hard-of-hearing persons by the use of hearing-aids having unsightly and annoying head-bands, long external wires and tubes, battery and microphone cases carried in or on the clothing.

Another object of the invention is to mount and support the receiver and microphone of a hearing-aid system in a temple piece of a spectacles frame, and which are in close proximity to each other and to the defective ear, to be served, in a manner that eliminates acoustical feedback within the usable range of amplification for the requirements of the user of the hearing-aid.

Accordingly, the present invention in its broadest aspects provides, as a hearing-aid, a spectacles frame having a frontal lens-carrying piece and two temple pieces extending therefrom to a point behind the ears of the wearer, at least one of the temple pieces carrying an electrical hearing aid comprising a microphone, a receiver, amplifying means and a source of electrical supply, and at least the microphone, source of electric supply and the amplifying circuit being contained within said temple-piece and the microphone being located in the rear end portion of the temple-piece to be positioned adjacent the proximate defective ear of the wearer, when the spectacles are worn, and with the receiver being positioned to serve the ear that is in juxta-relation with the microphone, and the microphone, receiver, amplifying means and source of electrical supply being electrically interconnected in an operative system.

It should be noted, also, that, by placing the microphone at the rear end portion of the temple bow of a spectacles frame and no farther forward thereof than immediately anterior of the defective ear it serves, advantage is taken of the physical law that "the intensity of sound decreases as a function of the square of the distance from its source," thereby the microphone receives the sounds, emanating from the nose, throat and mouth of the wearer, only with that intensity with which they are received by a normal ear of the wearer. Otherwise, the nasal, throat and mouth sounds from the wearer drown out or override other sounds that are desired.

Other objects and features of the present invention will be apparent as the detailed description thereof proceeds.

The invention resides in the combinations and organization of parts and in the sundry detailed features of construction hereinafter described and pointed out in the appended claims.

In order to aid in a clear understanding of this specification, reference may be made to the accompanying drawings which illustrate the invention as at present devised and in which:

Figure 1 is a perspective view of a conventional spectacles frame with each of its temple-pieces containing a complete hearing-aid assembly independent and separate from the hearing-aid parts or components in the other temple-piece, one side cover plate of one temple-piece being shown removed to illustrate the construction and organization of the component parts;

Figure 2 is a perspective view of the hinged cover employed at the rear ends of the temple-pieces or bows for permitting insertion and removal of a battery housed therein;

Figure 3 is a sectional view taken substantially on line 3—3 of Figure 1;

Figure 4 is a side view of the spectacles frame shown in Figure 1, on a slightly enlarged scale and looking toward the right-hand temple piece thereof but with its side cover-plate removed to illustrate the assemblage of parts therein and details of construction;

Figure 5 is a view of the cover-plate for the right-hand temple-piece and looking at the inner face thereof;

Figure 6 is a transverse sectional view taken substantially on line 6—6 of Figure 4 illustrating, particularly the position and mounting of the air conduction receiver;

Figure 7 is a transverse sectional view taken substantially on line 7—7 of Figure 4 illustrating the mounting of the combined volume-control or variable resistor and cut-off switch;

Figure 8:
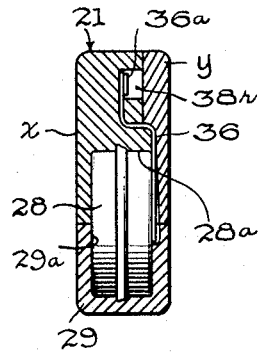
Figure 8 is a transverse sectional view taken substantially on line 8—8 of Figure 4 through the battery containing cavity.

Referring in detail to the drawings, in which similar reference characters employed in this specification refer to similar parts through the several views thereof, the complete binaural hearing aid of this invention is illustrated in Figure 1 and is entirely contained and supported within the temple-pieces 20 and 21 of a conventional spectacles frame S adapted to be worn by the user of the hearing aid, in the manner of eye-glasses, so as to move with the movements of the head of the user and so as to support separate and independent hearing-aid assemblies on opposite sides of the head to establish binaural hearing.

Each temple-piece or bow 20 and 21 contains therein a complete, separate and independent hearing-aid of the electrical amplified and volume-controlled type to serve its user at opposite sides of his head with the microphone and receiver of each hearing-aid in very close proximity to the natural ear canals therein, whereby the user may select the most comfortable amplification required for each individual ear separately. Since the temple pieces 20 and 21 and their hearing aids are identical, a description of one will suffice for the other.

The spectacles frame S, shown in Figure 1 on about actual scale, comprises the usual frontal lens-holding piece $f$ having the nose rests or pads $p$ on opposite sides of the nose-bridge $b$ and having temple-pieces or bows 20 and 21 connected at its end portions, respectively, in the usual manner. The bows 20 and 21 may each comprise an elongated bar-like member of light weight material, such as a plastic or metal, and of a length to extend for a distance in back of the ears of the wearer and fashioned so as to accommodate therein all of the elements of a hearing-aid. Bows 20 and 21, having a width of about ½ inch at their forward or hinged ends and about an inch at their rear ends and having a thickness of about ¼ to ⁵⁄₁₆ of an inch, are each adequate to have incorporated therein hearing-aid components shown in Figure 9 in the arrangement shown in Figures 1 and 4. Preferably, each bow 20 and 21 is formed of two longitudinally separable and complemental parts $x$ and $y$, of which the part $x$ may be thicker and connected or hinged at its forward end to the frontal piece $f$ by the usual hinge $h$ (Fig. 10) having a removable hinge-pin or by any suitable disconnectible means, the other thinner part $y$ forming a removable side cover-plate secured in position to its complemental part $x$ by screws 23, Fig. 3, extended through holes 24 in said cover-plate and registering with an internally threaded member 25 embedded in the parts $x$. The face of each bow part $x$, opposing its cover part or plate $y$, is formed with inter-connecting recesses, as shown in Figures 1 and 4, to receive and retain therein the components of an electrical hearing-aid; and the corresponding face of each cover-plate may be recessed opposite large components to a depth as will assure their proper accommodation between the parts $x$ and $y$ of the bows 20 and 21, while the smaller components are accomodated completely within the part $x$.

The arrangement of the component parts of a hearing-aid in each bow 20 and 21, as shown in Figures 1 and 4, is designed to place the microphone 40 and the receiver 41 (of an air conduction hearing aid) in very close proximity to the ear of the user to effect natural binaural hearing and to provide the rear end of each bow with the improved battery mounting shown and described in my copending United States application Ser. No. 401,629, filed December 31, 1953. To this end, the rear ends of the parts $x$ and $y$ of each bow 20 and 21 are formed with complemental arcuate recess 28a in their opposing faces and the chord of said recesses coincides with the rear end edges of the bow parts $x$ and $y$, thus forming an open ended substantially semi-circular pocket into which may be partially inserted and quickly moved a disc-like battery 28. The battery is held in place by a hinged cover 29.

It is preferred that the battery cover 29 be a substantially semi-circular rear end extension of its bow with its side and edge faces forming continuous extensions of edge and inner side face of the bow part $x$ and of the edge and outer side face of the bow part $y$, when the latter is in its closed position, as shown in Figure 1. The battery cover 29 is provided at one end of the chordal or secant portion of its perimeter with perforated and spaced ears 30 interengaging with or receiving therebetween a reduced adjacent marginal edge portion of the bow part x, through which portion and ears a pivot pin 31 extends to hingedly mount the battery cover 29 on the bow part x so that said chordal portion of the cover 29 will abut against or properly fit the rear end edge of the bow to form an extension thereof, as above stated, although another suitable hinge means may be employed. The chordal portion of the cover 29 is recessed inwardly to form a substantially semi-circular cavity 29a complementary to the pocket 28a in the bow so as to receive, retain and conceal the battery 28, when the cover 29 is in its closed position, as shown; but, when the cover 29 is open, a portion of the battery is accessible to the fingers of the user so that it may be withdrawn without the necessity of removing the side cover plate y of the bow.

A spring latch 32 is carried by the distal edge of the cover 29 and is in the form of a resilient metal strip molded in the cover 29 and has a detent portion 32a extending outwardly from the chordal portion of the cover 29 to project in a recess 33 in the bow part x and engage behind a shoulder 34 in said recess 33. A small hole 35 is provided in the upper surface of the bow part x and overlies and communicates with the recess 33 so that by inserting a small wire, or like implement, into the hole 35 the latch detent 32a may be depressed out of latching engagement with the shoulder 34, thus releasing the battery cover 29 and permitting it to be swung open on its hinge pin 31. Also molded in the bow part x and extending into its pocket recess 28a are resilient electrical terminal contact members 36 and 37 arranged to contact with the poles of the battery 28, as shown, these contact members being electrically contacted with the switch and mounting terminals 36a and 37a, respectively, of a combined switch and variable resistor 38 mounted in a recess 38a in the bow part x closely adjacent to the battery recess 28a therein.

The volume-control and off-and-on switch 38 is an available miniature embodiment of a conventional device used in electronic equipment comprising a disc-like body 38b, supporting the switch and variable resistor elements, and a wheel-like element 38w fast on a rotatable stud or shaft 38s journalled in the body 38b for effecting the operation of the device 38. The switch and mounting terminals 36a and 37a, as well as the variable resistor terminals 38v, are secured to and project radially from the body 38b. At least one of the switch terminals (36a in the drawings) is molded in the bow part x or set in a fitting recess, as at 38r, to hold and maintain the device 38 in position in its recess 38a. The recess 38a is, preferably, circular and is positioned and formed to intersect the top edge of the bow part x providing a slot 39 therein, through which slot 39 a peripheral portion of the wheel element 38w protrudes to be accessible for manual adjustment by the user.

Figure 9:
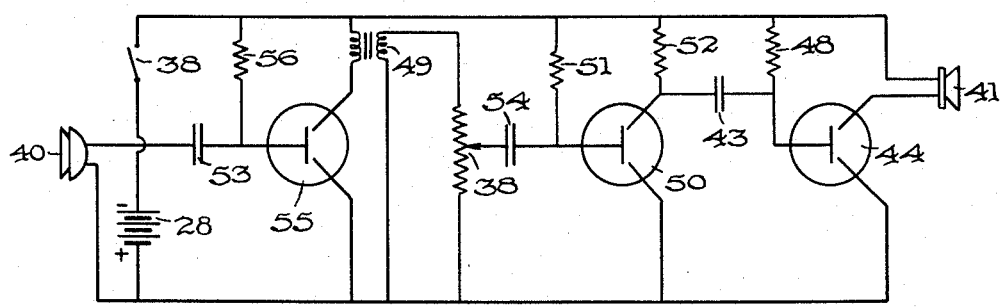
Figure 9 is a diagrammatical view of an amplifier circuit which may be employed for each independent hearing-aid system in each temple-piece.

The circuit diagram, shown in Figure 9, illustrates a conventional hearing aid, employing transistors, of the junction type, and each component thereof is shown mounted in each bow 20 and 21, respectively; and the arrangement thereof in each bow, as shown in Figures 1 and 4, particularly the microphone 40 and receiver 41, has been deliberate to produce the best results for binaural hearing. Therefore, in a recess 43a and below the volume-control and switch assembly 38 is disposed the condenser 43. Progressing from the recesses 38a and 43a toward the front or hinged end of the bows, the transistor 44 and the receiver 41 are next mounted in recesses 44a and 41a, respectively, the recess 41a being disposed under the recess 44a The transistor 44 is removably mounted in a transistor socket 44s secured, as by cementing, to a side wall of the recess 44a. The recess 41a is shaped to have an air conduction receiver positioned therein with its audio-output opening 41b facing or projecting into an aperture 41c in the bottom or underside edge of the bows 20 and 21. The audio-outlet opening 41b is, preferably, surrounded by an outwardly projecting flange 41d, over or about which is frictionally telescoped an end of a short conventional ear tube 45, preferably of soft flexible plastic material, in sealed contact with said flange. It will be noted that the positioning of the air conduction receivers 41 is such that each will be disposed just over or slightly forward of the ears of the wearer, when the hearing-aid of this invention is being worn, in order to position said receiver as close to the ears as possible and to require a very short inconspicuous ear tube 45. The ear tube 45 is only long enough to allow an ear plug 46, formed on the other end of said tube, to be securely inserted into the meatus or canal of the adjacent ear of the user so as to seal the ear canal completely from the outside. It is preferred that the plug 46 be of "foam" rubber.

Next to the receiver 41 in each bow 20 and 21, the microphone 40 is mounted in a recess 40a in the bow part x, the distance separating the receiver and microphone, as shown, being about 3/8 of an inch because of structural limitations although they may be more closely positioned. This close proximity of the receiver 41 and the microphone 40 is for the purpose of grouping them, in their respective bows, so that the microphones will be naturally positioned to effect true binaural hearing to allow use of a telephone receiver in the normal way and to position the microphone no farther forward than immediately anterior of the ear it serves in order to be as far as possible from the mouth of the user, having in mind the physical law that the intensity of sound decreases as a function of the square of the distance from the source of the sound. I have found, however, to so group the receiver and its microphone and mount them in or on the same supporting means—particularly if the latter is of hard or dense material—or to mount them one against the other, that acoustical feedback occurs, even at very low amplification of the received sound, such as destroys the usefulness of the hearing-aid even to those persons having slight hearing impairment. But, I have discovered that, when the receiver and microphone are mounted in the same supporting structure at a distance of about 3/16 of an inch apart, this acoustical feedback can be avoided within useful limits of amplification to bring the hearing of the majority, if not most all, hard-of-hearing persons up to the normal level of hearing. This may be accomplished by jacketing the receiver and the microphone in a soft cushioning material 47 such as "foam rubber" and this feedback may be further reduced by arranging the axes of the respective vibratory elements of the closely grouped microphone and receiver angularly relatively to each other. This seems to indicate that, possibly, the angular positioning of the microphone and receiver causes the feedback waves or vibrations to be out of phase, thus cancelling each other. Tests, so far conducted, have indicated that the optimum for this relative angular positioning of the axes of the microphone and receiver is at a relative angle of 90° and requires an amplifying or gain volume equivalent of approximately 51 decibels, or more, before feedback is perceptible. Amplification of anything less than 50 decibels is well within the range sufficient to bring the hearing of most hard-of-hearing persons to a normal level.

Consequently, the microphone 40 in each bow 20 and 21 is shown disposed in its recess 40a with its axis at substantially 90° relative to the axis of the receiver 41. To this end, each microphone 40 is positioned in its bow 20 or 21 with its axis substantially normal to the side faces of the bow and with its sound receiving opening or member 40b exposed to ambient soundwaves exterior of the spectacles frame S by means of an opening 40c in outerside bow plate y; and each receiver 41 is positioned in its bow 20 or 21 with its axis substantially parallel to said side faces of the bow and with its audio-outlet 41b opening through the lower and bottom edge of its supporting bow, as and for the purposes above described. It is very important, also, that no part of the microphone 40 or the receiver 41 be in physical contact with the side bow supporting it; and, as can be seen in Figures 1, 4 and 6, the microphone 40 and receiver 41 are each carefully mounted in a jacket 47 of foam rubber surrounding the outer surface thereof to cushion and acoustically insulate the same. The cushioning jackets 47, surrounding the receivers 41, each have a flanged opening therein which surrounds the nipple or flange 41d and an opening through which the circuit terminals 41t project. The jackets 47, surrounding the microphones 40, are each provided with a central opening registering with the inlet opening 40c in the plate y and with an opening through which the circuit terminals 40t project (see Figs. 2, 4 and 6).

The remainder of the conventional transistor hearing-aid circuit, and their components, shown in Figure 9, are mounted entirely in spaced recesses formed in the bow part x of one bow 20 or 21 as may be required (see Figs. 1 and 4) in the following order: resistor 48 is disposed next to the microphone 40 and is small enough to be completely contained in the bow part x without a complementary recess in bow part y; transformer 49 is directly ahead of resistor 48 and requires a complemental recess 48y in bow part y; transistor 50, and its socket 50s, and resistors 51 and 52 are disposed in a group in recesses 50a, 51a and 52a, respectively, in the bow part x directly ahead of transformer 49, the resistors 51 and 52 being arranged end-to-end directly above transistor socket 50s and no complemental recess is required for them in the bow part or side cover plate y, but is required for the transistor 50 as at 50y; next the condensers 53 and 54 are arranged in side-by-side recesses 53a and 54a in the bow part x and require complemental recesses 53y and 54y in the cover plate y; and, next and last, transistor 55 and its socket 55s are disposed in a recess 55a in bow part x and above which is disposed resistor 56 also in a recess 56a in bow part x, the transistor 55 requiring a complemental recess 55y in side cover plate y but not for resistor 56. All of these components of the hearing-aid circuit are removably cemented in their recesses in the bow part x (with a cement that may be dissolved with a solvent) and all of the recesses therein, with the exception of recess 28a, communicate with a channel c extending longitudinally of said bow part x which accommodates the wiring or harness of said circuit. The wiring has been omitted from Figures 1 and 4 for clarity. Also, all of the components of the hearing-aid circuit herein shown and described are avaiable on the market.

A major percentage of hard-of-hearing persons need only a relatively small amount of amplification in a hearing aid to afford hearing ability at a normal sound level. Audiograms reveal that, in almost every case, a hard-of-hearing person has an unbalance in sensitivity from one ear to the other ear.

In those cases, where only one ear may need aid, it is only necessary to provide one bow or temple-piece 20 or 21 with a hearing-aid therein in accordance with this invention.

However, when both ears of the user are defective, a complete and independent hearing-aid system is provided in each of the bows or temple-pieces 20 and 21 of a spectacles frame enabling sufficient amplification to bring the hearing of each ear up to normal level of hearing, thus producing binaural hearing without feedback, discomfort or conspicuously showing their need or use of a hearing-aid by the wearer; and, at the same time, by means of the separate and independent volume-control, permitting the user quickly to balance the sensitivity of his two ears, whenever required.

Figure 10:
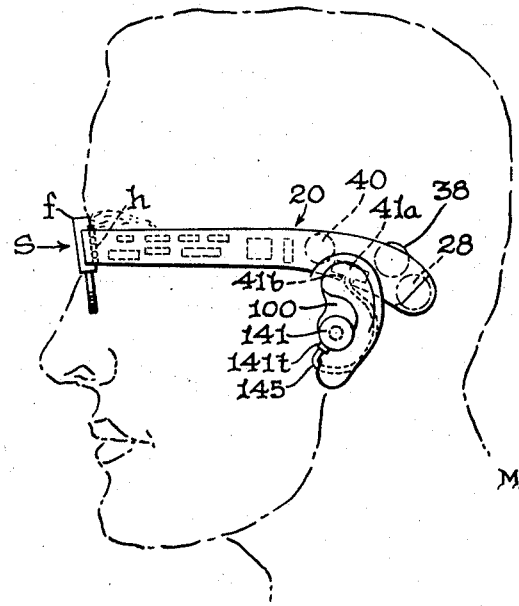
Figure 10 illustrates modified form of the invention being worn by a user.

Furthermore, it is within the purview of this invention, for those persons preferring to use an air-conduction-receiver fitted in the ears, as by a so-called "mold" or "button" shown in Figure 10, to eliminate the receivers 41 in either one or both bows 20 and 21 of the spectacles frame S and to electrically connect the "button" receiver to the circuit in the adjacent bow by short-wire-conductors entering the bow through the aperture 41c therein. In such cases, where the hearing-aid is being manufactured for use with "button" receivers, the microphone may be disposed in the bows 20 or 21 so as to be positioned directly above the ear of the wearer, when the spectacles frame is being worn.

In Figure 10, the hearing-aid device is the same as described and shown in connection with Figures 1 to 9, except that a receiver 141 is attached to a conventional ear mold 100, which is removably worn in the external ear or ears, respectively, of the user that has defective hearing. Electric-conductor wires, which are part of the hearing-aid circuit, shown in Figure 9 (and which connected with the terminals 41t in Figures 2 and 4) are extended through opening 41b in the temple-pieces 20 and 21 for a short distance, preferably as a single insulated extension 145, and are connected to the terminals 141t of the adjacent receiver 141.

Also, should a bone-conduction receiver be required or desired, it will be located in the area of the bows 20 and 21 herein shown as occupied by the switch-volume control device 38 so as to position it opposite the temporal mastoid bone against which it will bear and the device 38 may be located in the area herein shown as occupied by the microphone 40, the microphone in turn being lodged in the recess 41a herein shown as occupied by the air conduction receiver 41. This rearrangement of parts will still maintain the angular relation between the microphone and the bone-conduction receiver to overcome feedback, as the axis of the microphone would be substantially parallel with the side face of its bow 20 or 21 and the axis of the bone-conduction receiver would be substantially normal to said side faces of said bow; and the sound receiving opening or member 40b of the microphone would register with the aperture 41c suitably positioned to expose it to ambient sound waves.

It will be manifest from the above that the objects, aims and purposes of the present invention are attained by the hearing-aid herein shown and described, which affords true binaural hearing overcoming all of the objections to hearing-aids now in use and which is concealed in a spectacles frame providing a natural support therefor and eliminating the embarrassment encountered by hard-of-hearing persons in the use of presently available hearing-aids.

Having thus described my invention and the manner in which the same may be performed, it is to be understood that many changes may be made in the construction and arrangement of parts from those shown and described and that my invention is only to be limited by the scope of the appended claims considered in the light of the spirit of the invention.

That which is claimed as new and to be secured by Letters Patent is:

1. As a new article of manufacture, an inconspicuous and complete spectacles hearing-aid device, for aiding the binaural hearing of a hard-of-hearing person, comprising a spectacles eyeglass-lens-supportable frontal-piece, a first temple-piece and a second temple-piece both dimensioned to extend from opposite ends of frontal-piece respectively to behind an adjacent ear of the user, when worn; disconnectible interconnecting means on the ends of the frontal-piece and on the forward ends of said first and second temple-pieces for removable attachment respectively of the temple-pieces to said frontal-piece, a first hearing-aid system wholly incapsulated in said first temple-piece and a second hearing-aid system wholly incapsulated in said second temple-piece with no parts of said systems extending into the frontal-piece, each of said systems including a microphone, an electrical amplifying means and a receiver, means electrically and operatively interconnecting said hearing-aid instrumentalities of each system within their respective temple-piece; means in each of said temple-pieces to accommodate an electric battery therewithin and formed with an entree to permit said battery to be inserted therein and removed therefrom without otherwise disturbing said device and having terminals mounted therein from the system within its temple-piece to cooperatively contact with said battery to supply energy to said system, when the battery is inserted therein; means yieldably mounting the microphone and the receiver of each system in its respective temple-piece in a group in close proximity to each other and to insulate one from the sound vibrations of the other and at a location therein no farther forward than immediately anterior the ear adjacent the temple-piece in order to position the microphone-receiver group substantially at the adjacent ear they serve, when the device is on the head of the user in spectacles-wearing position, the receiver of each system having means positioned to transmit intelligible signals therefrom to an audible-responsive sensitivity of the user at the ear adjacent thereto, whereby the barrier of the head of the user will separate the microphone of one system from the microphone of the other system in order to produce phasing and true binaural hearing with the microphones remote from the nasal and oral cavities of the user; a volume-control in each of said systems having a finger-piece element accessible to the user and separate and independent of the other system, whereby each of said hearing-aid systems may have its gain adjusted entirely independently of the gain of the other in order that the ears of the user may achieve complete compensated and truly balanced binaural hearing assistance and whereby either of said temple-pieces may be detached and replaced with another temple-piece containing or not containing a hearing-aid system without disturbing the other or the frontal-piece of the device.

2. In a concealed inconspicuous spectacles hearing-aid of the type for aiding binaural hearing of a hard-of-hearing person, a support in the form of a spectacles-temple-piece dimensioned to extend substantially horizontally along the side of the face of the user from a point at the front of the face to a point behind a defective ear, when worn; means at the forward end of said temple-piece for removable attachment to an eyeglass-lens-supportable frontal-piece to cooperate therewith for mutually supporting each other in proper position on the face of the user; an electrical hearing-aid system including a microphone, an amplifier means and a receiver operatively interconnected; means within the rear end portion of said temple-piece resiliently and concealably mounting said microphone and receiver therein adjacent the defective ear of the user, when the device is worn, in a relatively close and spaced grouping spaced from the walls of said temple-piece, said microphone being exposed to ambient sound waves externally of said temple-piece and said receiver having means positioned to transmit signals therefrom to an audible-responsive sensitivity at said defective ear of the user; means within said temple-piece concealably mounting said amplifier means therewithin along its length and including a chamber formed with an entree to permit an electric battery to be inserted thereinto and removed therefrom without otherwise disturbing said device, electrical terminals mounted in said chamber and connected in said system and positioned to cooperatively contact with said battery to supply energy to said system, when the battery is inserted therein, said amplifying means including a volume-control having a finger-piece element positioned to be accessible to the user.

3. A hearing-aid device according to claim 2, wherein said microphone and said receiver in said temple-piece have the axes of their respective vibrating-members angularly related so as to further minimize acoustical feedback.

4. In a hearing-aid adapted to be worn on the face of a hard-of-hearing person, a support in the form of a spectacles-temple-piece dimensioned to extend horizontally along the side of the face of the user from a point at the front of the face to a point behind an adjacent defective ear of the user; means at the forward end of said temple-piece for removable attachment to an eyeglass-lens-supportable frontal-piece to cooperate therewith for mutually supporting each other on the face of the wearer, said temple-piece having an interior for completely housing an electrical hearing-aid amplifier instrumentality including a microphone and a battery, except the receiver, and further including means for holding said microphone therewithin at the rear end portion of said temple-piece in a location remote from its forward end and adjacent said defective ear of the wearer, when being worn; and a receiver-button formed to be rmovably mounted in and supported in the external ear portion of said defective ear of the user; a receiver carried by said receiver-button; and a short wire conductor means extending from said temple-piece and operatively connecting said receiver with the hearing-aid instrumentalities within said temple-piece.

5. As a new article of manufacture, an inconspicuous hearing-aid device for a hard-of-hearing person comprising a spectacles frame having rearwardly extending temple-members and to be donned and doffed as spectacles, each of said temple-members having an internally recessed portion opening outwardly through a side thereof; electrically powered hearing-aid parts including microphone means, amplifying means, volume-control means and receiver means with at least the microphone means, amplifier means and volume-control means disposed in said recessed portions of said temple-members; means electrically interconnecting said hearing-aid parts to produce hearing-aid assistance; the recessed portion of at least one of said temple-members having terminal contacts of said interconnecting means arranged therein to be removably contacted by a battery insertable in said recessed portion; said microphone means being disposed in and the receiver means being at least carried at the rear ends of said temple-members to be adjacent the ears of the wearer, when said device is donned; and an exterior removable cover-means carried by each temple-member and positioned to close the said recessed side portion therein to conceal the hearing-aid parts within said temple-member and to permit access thereto for repair and replacement; said volume-control means being operable exteriorly of said device.

6. A new article of manufacture as set forth in claim 5 wherein there is at least one volume-control means housed within a temple-member and has a manually operable element projecting exteriorly of the temple-member, and wherein there are releasable fastening means for removably retaining said cover-means in position on their respective temple-members.

References Cited in the file of this patent
UNITED STATES PATENTS

| | | |
|---|---|---|
| 1,154,069 | Soret | Sept. 21, 1915 |
| 2,207,705 | Cox | July 16, 1940 |
| 2,218,389 | Warmbier | Oct. 15, 1940 |
| 2,300,459 | Sanial | Nov. 10, 1942 |
| 2,348,629 | Johnson | May 9, 1944 |
| 2,506,981 | Weaver et al. | May 9, 1950 |
| 2,535,681 | Johnson | Dec. 26, 1950 |
| 2,545,731 | French | Mar. 20, 1951 |
| 2,613,282 | Scaife | Oct. 7, 1952 |
| 2,616,985 | Levy | Nov. 4, 1952 |
| 2,830,132 | Borg | Mar. 16, 1953 |
| 2,736,771 | Hanson et al. | Feb. 28, 1956 |
| 2,765,373 | Smith | Oct. 2, 1956 |
| 2,792,457 | Zapelloni | May 14, 1957 |

FOREIGN PATENTS

| | | |
|---|---|---|
| 229,074 | Switzerland | Sept. 30, 1943 |
| 1,000,724 | France | Oct. 17, 1951 |